US 8,416,947 B2
Apr. 9, 2013

(12) United States Patent
Schneider

(54) BLOCK CIPHER USING MULTIPLICATION OVER A FINITE FIELD OF EVEN CHARACTERISTIC

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 460 days.

(21) Appl. No.: 12/072,069

(22) Filed: Feb. 21, 2008

(65) Prior Publication Data

US 2009/0214024 A1 Aug. 27, 2009

(51) Int. Cl.
*H04L 29/06* (2006.01)
(52) U.S. Cl. .......................................... 380/28; 380/37
(58) Field of Classification Search ...................... 380/37
See application file for complete search history.

(56) References Cited

U.S. PATENT DOCUMENTS

| 4,157,454 | A | | 6/1979 | Becker |
| 5,003,597 | A | * | 3/1991 | Merkle ............................. 380/37 |
| 5,214,703 | A | | 5/1993 | Massey et al. |
| 5,619,576 | A | | 4/1997 | Shaw |
| 5,724,428 | A | | 3/1998 | Rivest |
| 5,799,088 | A | | 8/1998 | Raike |
| 6,061,449 | A | | 5/2000 | Candelore et al. |
| 6,122,379 | A | | 9/2000 | Barbir |
| 6,247,112 | B1 | | 6/2001 | Seki |
| 6,523,114 | B1 | | 2/2003 | Barton |
| 6,560,338 | B1 | | 5/2003 | Rose et al. |
| 6,999,588 | B1 | | 2/2006 | Oishi |
| 7,103,181 | B2 | | 9/2006 | Ananth |
| 7,263,540 | B1 | | 8/2007 | Kuehnel |
| 7,328,228 | B2 | | 2/2008 | Klein et al. |
| 7,795,899 | B1 | | 9/2010 | Grohoski et al. |
| 7,925,009 | B2 | | 4/2011 | Schneider |
| 7,945,049 | B2 | | 5/2011 | Schneider |
| 7,962,540 | B2 | | 6/2011 | Michaels et al. |
| 8,265,272 | B2 | | 9/2012 | Schneider |
| 2001/0029608 | A1 | | 10/2001 | Nagashima et al. |
| 2001/0033656 | A1 | | 10/2001 | Gligor et al. |
| 2002/0054679 | A1 | | 5/2002 | Vesely |
| 2002/0124033 | A1 | | 9/2002 | Takahashi |
| 2002/0136406 | A1 | * | 9/2002 | Fitzhardinge et al. ........ 380/210 |
| 2003/0048728 | A1 | | 3/2003 | Kuribayashi et al. |
| 2003/0048899 | A1 | | 3/2003 | Spacey |
| 2003/0059040 | A1 | | 3/2003 | Rose et al. |
| 2003/0217268 | A1 | | 11/2003 | Gantman |
| 2004/0120518 | A1 | * | 6/2004 | Macy et al. ...................... 380/29 |
| 2004/0215686 | A1 | * | 10/2004 | Yoon et al. ...................... 708/492 |
| 2005/0065955 | A1 | | 3/2005 | Babikov et al. |
| 2005/0097153 | A1 | | 5/2005 | Dirscherl et al. |
| 2005/0131961 | A1 | | 6/2005 | Margolus |

(Continued)

OTHER PUBLICATIONS

Fischer. "Realization of the Round 2 AES Candidates Using Altera FPGA". 2000. pp. 1-15.*

(Continued)

*Primary Examiner* — Hadi Armouche
*Assistant Examiner* — Lisa Lewis
(74) *Attorney, Agent, or Firm* — Lowenstein Sandler LLP

(57) ABSTRACT

An input block of data and a key that includes multiple sub-keys are received by a block cipher. A nonlinear substitution is performed on at least a portion of the data, wherein the nonlinear substitution is achieved by multiplying the portion of the data by one of the sub-keys over a finite field of even characteristic, modulo a fixed primitive polynomial. An output block of ciphertext is then generated.

18 Claims, 6 Drawing Sheets

U.S. PATENT DOCUMENTS

| | | | |
|---|---|---|---|
| 2005/0177727 A1 | 8/2005 | Moskowitz et al. | |
| 2005/0246215 A1 | 11/2005 | Rackham | |
| 2006/0126843 A1 | 6/2006 | Brickell et al. | |
| 2006/0129419 A1 | 6/2006 | Flaxer et al. | |
| 2006/0156187 A1 | 7/2006 | Wu et al. | |
| 2007/0076890 A1 | 4/2007 | Muresan et al. | |
| 2007/0237327 A1 | 10/2007 | Taylor et al. | |
| 2008/0069342 A1 | 3/2008 | Relyea | |
| 2008/0109501 A1* | 5/2008 | Douguet et al. | 708/250 |
| 2008/0130876 A1 | 6/2008 | Etienne et al. | |
| 2008/0292096 A1 | 11/2008 | Schneider | |
| 2008/0298583 A1 | 12/2008 | Ahmed | |
| 2008/0307024 A1 | 12/2008 | Michaels et al. | |
| 2009/0060179 A1 | 3/2009 | Schneider | |
| 2009/0060180 A1 | 3/2009 | Schneider | |
| 2009/0195370 A1 | 8/2009 | Huffman et al. | |
| 2009/0214024 A1 | 8/2009 | Schneider | |
| 2009/0220083 A1 | 9/2009 | Schneider | |
| 2009/0279690 A1 | 11/2009 | Michaels et al. | |
| 2009/0292752 A1 | 11/2009 | Schneider | |
| 2010/0135486 A1 | 6/2010 | Schneider | |
| 2011/0213819 A1 | 9/2011 | Douguet et al. | |

OTHER PUBLICATIONS

Schneier. "Applied Cryptography." 1996. John Wiley and Sons, 2nd Edition, p. 319.*

Schneier. "Applied Cryptography." 1996. John Wiley and Sons, 2nd Edition, p. 237.*

Federal Information Processing Standards Publication 46-2 "Data Encryption Standard (DES)" Dec. 30, 1993, 16 pages. http://www.itl.nist.gov/fipspubs/fip46-2.htm.

Mirza, Fauzan "Block Ciphers and Cryptanalysis", Mar. 1998, pp. 1-27.

Shannon, C. E, "Communication Theory of Secrecy Systems", *Bell System Technical Journal*, vol. 28 (4), 1949, pp. 656-715.

Barker, William C., "Recommendation for the Triple Data Encryption Algorithm (TDEA) Block Cipher", National Institute of Standards and Technology, Technology Administration U.S. Department of Commerce, Information Security, NIST Special Publication 800-67, Version 1.1, Revised May 19, 2008, (May 2004), 40 pages.

Bauer, Friedrich L., "8. Transposition Ciphers", Decrypted Secrets, 2nd edition, (2000), 16 pages.

Belal, Ahmed A., et al., "2D-Encryption Mode" Mar. 2001, 32 pages.

Bellare, M., et al., "A Conventional Authenticated-Encryption Mode" Submission to National Institute of Standards and Technology, Apr. 13, 2003, 14 page.

Bellare, M., et al., "The FFX Mode of Operation for Format-Preserving Encryption" Feb. 20, 2010, pages.

Black, John, et al., "A Suggestion for handling Arbitrary-Length Messages with the CBC MAC", Aug. 2001, 3 pages.

Brier, Eric, et al., "BPS: a Format-Preserving Encryption Proposal" 11 pages, Ingenico, France. Published at the following website Apr. 2010, http://csrc.nist.gov/groups/ST/toolkit/BCM/modes development.html.

Cohen, Bram, "AES-hash" May 2, 2001, 4 pages.

"Data Encryption Standard (DES)", U.S. Department of Commerce/National Institute of Standards and Technology, FIPS PUB 46-3, Reaffirmed Oct. 25, 1999, 26 pages.

Dworkin, Morris, "Recommendation for Block Cipher Modes of Operation—Galois/Counter Mode (GCM) and GMAC" National Institute of Standards and Technology, Technology Administration U.S. Department of Commerce, Information Security, NIST Special Publication 800-38D, Nov. 2007, 39 pages.

Dworkin, Morris, "Recommendation for Block Cipher Modes of Operation—Methods and Techniques" National Institute of Standards and Technology, Technology Administration U.S. Department of Commerce, Information Security, NIST Special Publication 800-38A, 2001, 66 pages.

Dworkin, Morris, "Recommendation for Block Cipher Modes of Operation—The CCM Mode for Authentication and Confidentiality" National Institute of Standards and Technology, Technology Administration U.S. Department of Commerce, Information Security, NIST Special Publication 800-38C, May 2004, updated 2007, 27 pages.

Dworkin, Morris, "Recommendation for Block Cipher Modes of Operation—the CMAC Mode for Authentication" National Institute of Standards and Technology, Technology Administration U.S. Department of Commerce, Information Security, NIST Special Publication 800-38B, May 2005, 25 pages.

Dworkin, Morris, "Recommendation for Block Cipher Modes of Operation—the XTS-AES Mode for Confidentiality on Storage Devices" National Institute of Standards and Technology, Technology Administration U.S. Department of Commerce, Information Security, NIST Special Publication 800-38E, Jan. 2010, 12 pages.

Gligor, Virgil D., et al., "Fast Encryption and Authentication: XCBC Encryption and EXCB Authentication Modes" Mar. 30, 2001 (Apr. 20, 2001, revision), 64 pages, retrieved from http://csrc.nist.gov/groups/ST/toolkit/BCM/modes_development.html.

Gligor, Virgil D., et al., "On Message Integrity in Symmetric Encryption" Nov. 10, 2000, 41 pages. VDG Inc., Maryland.

Håstad, Johan, et al., "Key Feedback Mode: a Keystream Generator with Provable Security" Oct. 11, 2000, 23 pages, Stockholm, Sweden.

Hellstrom, Henrick, "Propagating Cipher Feedback mode" 2001, 4 pages.

Housely, Russ, et al., "Counter with CBC-MAC (CCM)—AES Mode of Operation" RSA Laboratories, Submission to National Institute of Standards and Technology, Jun. 3, 2002, 9 pages.

Iwata, Tetsu, et al., "OMAC: One-Key CBC MAC" Dec. 20, 2002, 32 pages.

Jaulmes, Antoine Joux, et al., "On the Security of Randomized CBC-MAC Beyond the Birthday Paradox Limit a New Construction" 2002, 15 pages, DCSSI Crypto Lab.

Jutla, Charanjit S., "Encryption Modes with Almost Free Message Integrity" IBM T.J. Watson Research Center, New York, 2001, 6 pages.

Jutla, Charanjit S., "Parallelizable Encryption Mode with Almost Free Message Integrity" IBM T.J. Watson Research Center, 2000, 23 pages.

Knudsen, Lars R., "Reports in Informatics—Block Chaining modes of operation" Oct. 2000, 16 pages, Report No. 207, Department of Informatics, University of Bergen, Bergen, Norway.

Kohno, Tadayoshi, et al., "The CWC Authenticated Encryption (Associated Data) Mode" May 27, 2003, 18 pages, Submission to National Institute of Standards and Technology.

Kurosawa, Kaoru, et al., "TMAC: Two-Key CBC MAC" Jun. 21, 2002, 18 pages.

Lipmaa, Helger, et al., "Comments to NIST concerning AES Modes of Operations:" CTR-Mode Encryption 2000, 4 pages.

Mattsson, Ulf T., "Format-Controlling Encryption using Datatype-Preserving Encryption" Jun. 30, 2009, 46 pages, Protegrity Corporation.

McGrew, David A., et al., The Galois/Counter Mode of Operation (GCM) Submission to National Institute of Standards and Technology, May 31, 2005, 44 pages.

Rogaway, Phillip, "PMAC—Proposal to NIST for a parallelizable message authentication code" Apr. 1, 2001, 27 pages.

Rogaway, Phillip, et al., "OCB: A Block-Cipher mode of operation for Efficient Authenticated Encryption" Aug. 3, 2001, 36 pages.

Rogaway, Phillip, et al., "The SIV Mode of Operation for Deterministic Authenticated-Encryption (Key Wrap) and Misuse-Resistant Nonce-Based Authenticated-Encryption" Aug. 20, 2007, 3 pages, retrieved from http://csrc.nist.gov/groups/ST/toolkit/BCM/modes_development.html.

Rose, Greg , "A Stream Cipher Based on Linear Feedback over GF(28)", Springer-Verlag Berlin Heidelberg, C. Boyd and E. Dawson: ACISP '98, LNCSI1438, (1998), pp. 135-145.

RSA, "What is Cipher Block Chaining Mode?" Mar. 3, 2007 from Internet Archive WayBack machine. http://web.archive.org/web/20070303121357/http://www.rsa.com/rsalabs/node.asp?id=2171.

Schroeppel, Richard C., et al., "Cipher-State (CS) Mode of Operation for AES" Sandia National Laboratories, Submission to National Institute of Standards and Technology, May 7, 2004, 8 pages.

Tan, Chih Jeng K., "The PLFG parallel pseudorandom number generator", Future Generation computer Systems vol. 18, Issue 5, (Feb. 2002), pp. 693-698.
"Transposition cipher", Wikipedia, the free encyclopedia, http://en.wikipedia.org/wiki/Transposition_cipher, accessed May 8, 2007, 8 pages.
Red Hat Office Action for U.S. Appl. No. 11/807,261 mailed Jul. 19, 2010.
Red Hat Office Action for U.S. Appl. No. 12/074,012 mailed Sep. 3, 2010.
Red Hat Office Action for U.S. Appl. No. 12/325,228 mailed Sep. 3, 2010.
Applied Cryptography, 2nd Edition, Chapter 17, pp. 417-418.
"Blum Blum Shub" from Wikipedia, the free encyclopedia, http://en.wikipedia.org/wiki/Blum_Blum_Shub. Aug. 9, 2007, 2 pages.
"Finite Field" from Wikipedia, the free encyclopedia. http://en.wikipedia.org/wiki/Galois_field, Aug. 10, 2007, 5 pages.
"Secure Cryptoprocessor" from Wikipedia, the free encyclopedia. http://en.wikipedia.org/wiki/Secure_cryptoprocessor. Aug. 10, 2007, 3 pages.
Wolfram Math World, Primitive Polynomials, http://mathworld.wolfram.com/primitivepolynomial.html, pp. 1-2, Feb. 9, 2006 from Internet Archive WayBack Machine.
Red Hat Office Action for U.S. Appl. No. 11/897,411 mailed Sep. 2, 2010.
Red Hat Office Action for U.S. Appl. No. 11/897,414 mailed Sep. 2, 2010.
Red Hat Notice of Allowance for U.S. Appl. No. 11/807,261 mailed Dec. 14, 2010.
Fischer, Viktor, "Realization of the Round 2 AES Candidates Using Altera FPGA", (2000), pp. 1-15.
Red Hat Office Action for U.S. Appl. No. 11/807,261 Mailed Feb. 28, 2011.
Notice of Allowance for U.S. Appl. No. 11/807,261 Mailed Mar. 14, 2011.
Red Hat Office Action for U.S. Appl. No. 11/897,411 Mailed Jan. 5, 2011.
U.S. Appl. No. 11/897,411, Final Office Action dated Jan. 5, 2011.
U.S. Appl. No. 11/897,414, Final Office Action dated Dec. 28, 2010.
U.S. Appl. No. 12/074,012, Notice of Allowance dated Jan. 11, 2011.
U.S. Appl. No. 12/325,228, Final Office Action dated Feb. 4, 2011.
U.S. Appl. No. 12/154,465, Office Action dated Sep. 20, 2010.
U.S. Appl. No. 12/154,465, Final Office Action dated Jan. 7, 2011.
McLauchlin, Apr. 6, 2007, "Random Number Generation for Cryptography," http://imps.mcmaster.ca/courses/SE-4C03-07/wiki/mclaucwj/Random_Number_Generation_for_Cryptography.html, pp. 103.
Red Hat Office Action for U.S. Appl. No. 11/897,411, mailed Dec. 21, 2011.
Red Hat Office Action for U.S. Appl. No. 11/897,411, mailed Aug. 26, 2011.
Red Hat Office Action for U.S. Appl. No. 11/897,414 Mailed Dec. 1, 2011.
Red Hat Notice of Allowance for U.S. Appl. No. 12/074,012 Mailed Jan. 11, 2011.
Red Hat Office Action for U.S. Appl. No. 12/125,833, mailed Dec. 9, 2011.
Red Hat Office Action for U.S. Appl. No. 12/154,465, mailed Dec. 28, 2011.
Red Hat Office Action for U.S. Appl. No. 12/154,465, mailed Aug. 19, 2011.
Red Hat Office Action for U.S. Appl. No. 12/325,228, mailed Oct. 14, 2011.
Red Hat Office Action for U.S. Appl. No. 12/125,833, mailed Mar. 16, 2012.
"Blum Blum Shub Generator" from httpws:www.cs.indiana.edu/~kapadia/project2/node11.html, 1 page May 30, 2011.
Stein, "Visualizing Galois Fields", May 17, 2012, pp. 1-11 from http://nklein.com/2012/05/visualizing-galois-fields/.
USPTO; Office Action for U.S. Appl. No. 11/897,411, mailed May 9, 2012.
USPTO; Office Action for U.S. Appl. No. 11/897,411, mailed Sep. 13, 2012.
USPTO; Notice of Allowance for U.S. Appl. No. 11/897,414 mailed May 10, 2012.
USPTO; Notice of Allowance for U.S. Appl. No. 12/325,228, mailed Sep. 14, 2012.
USPTO; Office Action for U.S. Appl. No. 12/154,465, mailed May 4, 2012.
USPTO; Office Action for U.S. Appl. No. 12/154,465, mailed Sep. 19, 2012.

* cited by examiner

BLOCK CIPHER USING MULTIPLICATION OVER A FINITE FIELD OF EVEN CHARACTERISTIC

TECHNICAL FIELD

Embodiments of the present invention relate to data encryption, and more specifically to data encryption with a block cipher that uses multiplication over a finite field of even characteristic.

BACKGROUND

Encryption is a process of transforming information (referred to as plaintext) into an unreadable form (referred to as ciphertext). Decryption is a transformation that recovers the plaintext from the ciphertext. A cipher performs a transformation that is controlled using a symmetric key (same key used for ciphering and deciphering) or an asymmetric key (different keys used for ciphering and deciphering) such that when the key is input to the cipher along with plaintext, the plaintext is enciphered via an encryption transformation, and when the key is input to the cipher along with ciphertext, the ciphertext is deciphered via a decryption transformation (which is an inverse of the encryption transformation). Encryption transformations are performed by an encryption algorithm (function) of a cipher, and decryption transformations are performed by a decryption algorithm (function) of the cipher.

Encryption is used to protect military and civilian systems, examples of which include internet e-commerce, mobile telephone networks, bank automatic teller machines, etc. As technology and computing power advance, new vulnerabilities are commonly discovered for encryption mechanisms that were previously considered secure. When such weaknesses are discovered, new encryption mechanisms and techniques are required to maintain security of sensitive information.

FIG. 1 illustrates a conventional encryption system 100. In the conventional encryption system 100, a message source 105 generates a message that includes plaintext data and sends it to encipherer 115. Encipherer 115 also receives a key from a key source 110. Encipherer 115 uses the key to encrypt the plaintext data into ciphertext, and then transmits the ciphertext to a decipherer 120 over a potentially unsecure channel. Decipherer 120 also receives the key from the key source 110 via a secure channel. Decipherer 120 decrypts the ciphertext using the key to re-create the plaintext data, and then transmits the plaintext data to a destination 130. The transmission of the ciphertext between the encipherer 115 and a decipherer 120 is exposed to the risk that a cryptanalyst 125 will intercept the ciphertext and attempt to decrypt it to re-create the plaintext. Therefore, it is important that the encipherer 115 and decipherer 120 use an encryption scheme that is resistant to decryption attacks.

BRIEF DESCRIPTION OF THE DRAWINGS

The present invention is illustrated by way of example, and not by way of limitation, in the figures of the accompanying drawings and in which.

DETAILED DESCRIPTION

Figure 1:
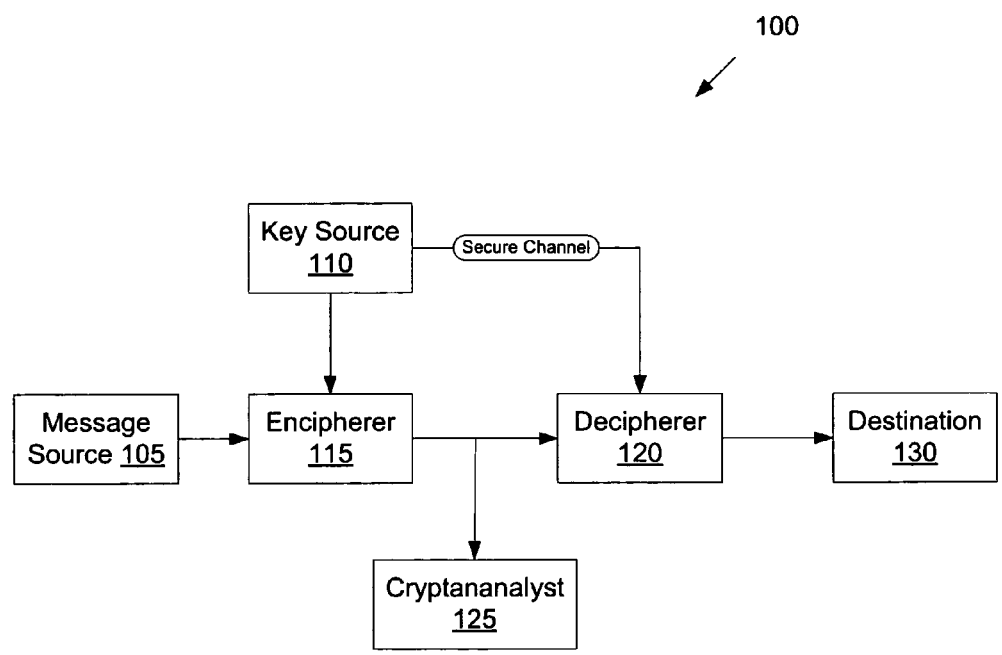
FIG. 1 illustrates a conventional encryption system.

Described herein is a method and apparatus for encrypting and decrypting data. In one embodiment, an input block of data and a key are received by a block cipher. In one embodiment, the key includes multiple sub-keys. A nonlinear substitution is performed by the block cipher on at least a portion of the data. The nonlinear substitution can be achieved by multiplying some or all of the data by one of the multiple sub-keys over a finite field of even characteristic, modulo a fixed primitive polynomial. A permutation may also be performed on some or all of the data. Multiple rounds of encryption may be performed, each round of encryption including performing the nonlinear substitution and/or the permutation. In one embodiment, a different sub-key is used for each round of encryption. An output block of ciphertext is finally generated.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "generating", "forwarding", "receiving", "performing", "encrypting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

To better equip a reader to be able to understand the detailed description included herein, a brief description of finite field arithmetic is provided. A finite field (also known as a Galois Field) is a field that contains only finitely many elements. A finite field can be represented mathematically as $GF(p^m)$, where p is a prime number called the "characteristic" and m is an integer greater than or equal to 1 called the "dimension" of the field. Each finite field has an "order" in the form of $p^m$, which represents the number of elements within the finite field. There exists a unique finite field of the order $p^m$ for every prime number p and integer $m \geq 1$, up to isomorphism. Any two finite fields with the same number of elements are isomorphic.

Arithmetic in a finite field is different than standard integer arithmetic. Using finite field arithmetic, all operations performed in the finite field result in an element of the finite field. For example, in a finite field of GF(2) the only elements of the field are 0 and 1, and thus 1+1=0. Elements of a finite field $GF(P^m)$ may be represented as polynomials of degree strictly less than m over GF(p). Mathematical operations (e.g., addition, multiplication, etc.) can be performed modulo Y, where Y is a primitive polynomial of degree m over GF(p). A primitive polynomial is a minimal polynomial of a primitive element of the extension field $GF(p^m)$.

In certain embodiments of this invention, finite fields of $GF(2^m)$ are used for the purposes of cryptography. In such finite fields, in which the prime (p) is of even characteristic (2), polynomials can be represented as binary strings. For example, the polynomial $x^6+x^4+x+1$ can be represented as the binary string 1010011. In finite fields with characteristic 2, addition and subtraction are identical, and can be accomplished using the exclusive OR (XOR) operator. The symbol $\oplus$ represents addition within a finite field. Multiplication for such finite fields is polynomial multiplication modulo a primitive polynomial of degree m over GF(2). The symbol $\otimes$ represents multiplication within a finite field.

Figure 2A:
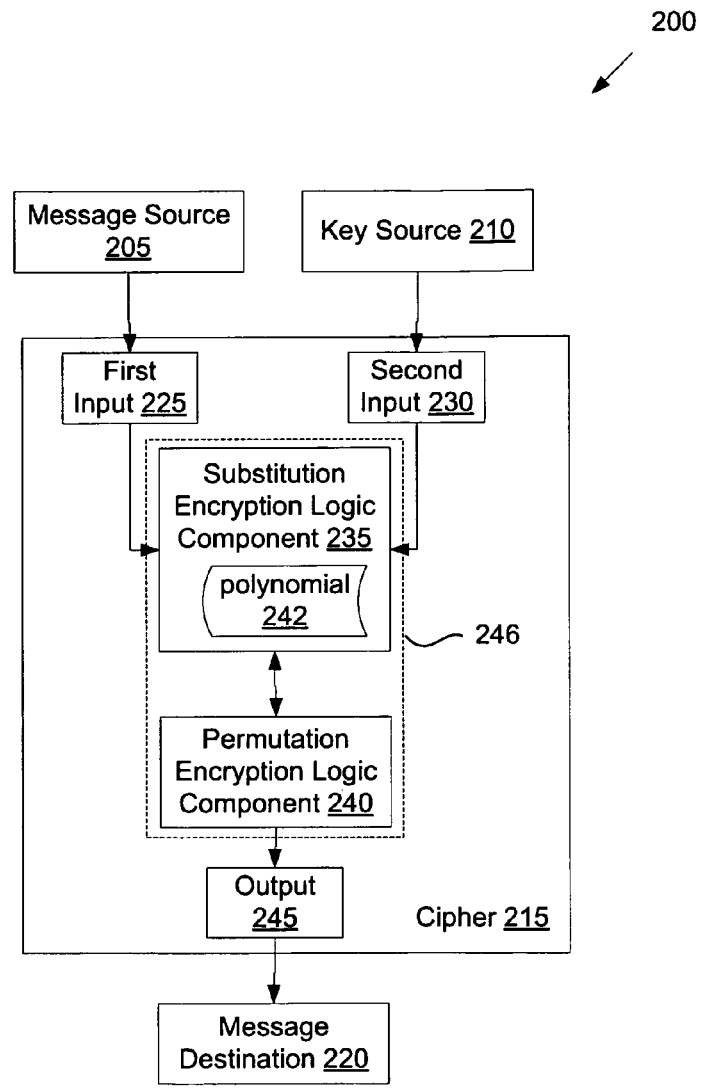
FIG. 2A illustrates an encryption system, in accordance with one embodiment of the present invention.

FIG. 2A illustrates an encryption system 200, in accordance with one embodiment of the present invention. The encryption system 200 may include a message source 205, a key source 210, a cipher 215 and a message destination 220. Message source 205 may be a user, an application (e.g., a mail application), a file system or database, a region of memory, or some other source. Message source 205 can transmit or otherwise provide plain text data or cipher text data to cipher 215 for encryption or decryption, respectively. The cipher 215 enciphers (encrypts) or deciphers (decrypts) such data before sending the data on to a message destination 220.

To encipher or decipher the received data, cipher 215 receives a secret key from a key source 210. In one embodiment, the key source 210 is a key generator that can receive an input from a user, and use that input to generate a key or multiple keys. The key source 210 may, for example run a hash over a received password multiple times to generate a key. The key source 210 may also use a random bit generator that is keyed to a user password. In one embodiment, the key source 210 uses a stream cipher with a starting state that is based on a user password to generate keys. Alternatively, the key source 210 may be a memory or other storage location that stores keys. For example, the key source may be a universal serial bus (USB) key token, a protected region of memory used to store keys, etc.

In one embodiment, cipher 215 is a block cipher. Block ciphers are substitution ciphers that operate on fixed-length groups of bits known as blocks. Where data to be encrypted is longer than a block, the data is divided into multiple blocks, and each block is separately encrypted. In one embodiment, block ciphers have an encryption and a decryption algorithm, each of which accepts an input block of size n bits as a first input and a key of size k bits as a second input, and produce an n-bit output block. For example, a block cipher might take as an input a 128-bit block of plaintext (unciphered data) and an 80 bit key, and output a corresponding 128-bit block of ciphertext (ciphered data). Likewise, the block cipher may take as an input a 128-bit block of ciphertext and the 80 bit key, and output a 128-bit block of plaintext. In another embodiment, the encryption algorithm may accept an input block of size m bits, and output a block of size n bits, and the decryption algorithm may accept an input block of size n bits, and output a block of size m bits. Common block sizes for a block cipher to operate on include 64 bit (8 byte) and 128 bit (16 byte), and common key sizes include 40 bits, 56 bits, 64 bits, 80 bits, 128 bits, 160 bits, 168 bits, 192 bits and 256 bits. Other sized blocks and keys may also be used. Increasing the size of the key may increase the difficulty of deciphering the ciphertext without the key.

Ciphertext output by block ciphers may include the same set of symbols as the input plaintext, or a different set of symbols. Moreover, an output alphabet (set of output symbols) of a block cipher may have a number of symbols that is the same as or different from the number of symbols in an input alphabet (set of input symbols). Examples of block ciphers include two fish, blowfish, serpent, data encryption standard (DES), advanced encryption standard (AES), CAST5, international data encryption algorithm (IDEA), etc.

For a block cipher to be made secure, it may be used in a mode of operation, which may encrypt different blocks in different ways. Thereby, even if two different blocks include the same plaintext, the corresponding ciphertext will be different for the two blocks. Examples of modes of operation include electronic codebook (EBC), cipher-block chaining (CBC), propagation cipher-block chaining (PCBC), cipher feedback (CFB), output feedback (OFB), etc.

Cipher 215 may include a first input 225 for receiving data to be encrypted or decrypted and a second input 230 for receiving keys. In one embodiment, cipher 215 includes an encryption component 246 that is configured to operate on blocks of data that have m bits (e.g., 8 bits, 16 bits, 64 bits, 128 bits, etc.) using a key that has k bits. In one embodiment, the first input 225 divides the received data into multiple blocks, each of which has a bit size (e.g., m bits) that can be operated upon by the encryption component 246. First input 225 can then transmit each m bit data block to the encryption component 246 sequentially.

An encryption key that is received by second input 230 may include more bits than necessary for encryption component 246 to encrypt or decrypt data (e.g., more than k bits). Second input 230 may divide such a received key into multiple subkeys, each of which may have k bits and can be used by encryption component 246.

In one embodiment, encryption component 246 includes a substitution encryption logic component 235 and a permutation encryption logic component 240. In another embodiment, encryption component 246 includes multiple substitution encryption logic components 235 and multiple permutation encryption logic components 240. In still another embodiment, the encryption component 246 includes one or more substitution encryption logic components 235 and no permutation encryption logic components 240. In the illustrated embodiment, the substitution encryption logic component 235 receives the data block from the first input 225 and the key (or sub-key) from the second input 230. The substitution encryption logic component 235 performs a substitution operation on the received data using a polynomial 242 and the received key. In one embodiment, substitution encryption logic component 235 performs a nonlinear substitution on the block of data. In a further embodiment, the nonlinear substitution is achieved by multiplying the data block by the key (or sub-key) over a finite field of even characteristic (e.g., $GF(2^m)$), modulo the polynomial 242. In still a further embodiment, polynomial 242 is a fixed primitive polynomial of a finite field $GF(2^m)$. The fixed primitive polynomial may be a dense polynomial (a polynomial having many terms, e.g., $x^5+x^4+x+x+1$) or a sparse polynomial (a polynomial having few terms, e.g., $x^5+x^2+1$). In one embodiment, sparse polynomials are used in software implementations to reduce processing time.

Polynomial multiplication performed over a finite field of even characteristic has the property that all of the output bits of a block depend on all of the input bits. However, this dependency does not introduce any propagation delays for carried bits (e.g., there is no carry over from one bit position that will influence the result of another bit position). This property enables multiplication over a finite field of even characteristic to be pipelined efficiently, and allows for fast calculations in hardware implementations.

Substitution encryption logic component 235 can output the data to permutation encryption logic component 240, which can then perform a permutation operation on the data. The permutation operation may rearrange the order of the bits in the data block in a specified manner. For example, a simple permutation may switch the position of half of the bits of the data block with the other half of the bits of the data block. A more complex permutation may, for example, perform a shuffle reordering, where the second half of the bits occupy successive even bit slots, and the first half occupies successive odd bit slots. In an alternative embodiment, permutation encryption logic component 240 may receive the data and the key from first input 225 and second input 230, respectively. In such an embodiment, permutation encryption logic component 240 may then send resulting data block to substitution encryption logic component 235 after performing a permutation operation on the data block.

In an example, assume that a received block of plaintext data is 0110 0001 (the ASCII representation for the letter 'a'), the key is 1010, and the fixed primitive polynomial is 10011 ($x^4+x+1$), which is a primitive polynomial over GF(2) and generates the finite field $GF(2^4)$. The nonlinear substitution could, for example, be achieved by multiplying the left half of the plaintext data (0110) by the key, modulo the primitive polynomial, and adding the result to the right half of the plaintext data (0001), as follows:

$$(0110 \otimes 1010 \bmod 10011) \oplus 0001 = 1001 \oplus 0001 = 1000$$

The permutation could then, for example, be achieved by swapping the resultant right half of the data (1000 now) with the left half of the data (still 0110) to obtain 1000 0110.

In one embodiment, substitution encryption logic component 235 and permutation encryption logic component 240 each operate on the data block multiple times. Therefore, after operating on the data block, permutation encryption logic component 240 may transmit the data block back to substitution encryption logic component 235, which may operate on the data block and then transmit it back to permutation encryption logic component 240. This process may continue until each of the substitution encryption logic component 235 and permutation encryption logic component 240 has operated on the data block a fixed number of times. Each time both the substitution encryption logic component 235 and permutation encryption logic component 240 operate on the data block is designated as a round of operation. Increasing the number of rounds of operations increases the difficulty of deciphering the resulting ciphertext (data block) without the key, but also generally increases the amount of time necessary to encrypt and decrypt the data block.

Continuing the example described above, assume that the substitution encryption logic component 235 and the permutation encryption logic component 240 will each operate on the data twice (2 rounds of operation), and that during each round of operation a different sub-key is used. After the first round of operation, the result was 1000 0110. If a second sub key is 1001, then the second round would include the following operation by the substitution encryption logic component:

$$(1000 \otimes 1001 \bmod 10011) \oplus 0110 = 0100 \oplus 0110 = 0010$$

After the permutation encryption logic component 240 operates on the data block in the second round of operation, the resulting ciphertext would be 0010 1000.

In another embodiment, in which encryption component 246 includes multiple substitution encryption logic components 235 and multiple permutation encryption logic components 240, each individual substitution encryption logic component 235 and permutation encryption logic component 240 operates on the data only a single time. In such an embodiment, the substitution encryption logic component 235 and permutation encryption logic component 240 may be arranged serially in an alternating pattern. For example, an encryption component 246 that performs 2 rounds of encryption could include, in the following order, a first substitution encryption logic component connected to the first input 225 and second input 230, a first permutation encryption logic component connected to the first substation encryption logic component, a second substitution encryption logic component connected to the first permutation encryption logic component, and a second permutation encryption logic component connected to the second substitution encryption logic component. Such a configuration may provide improved performance when embodied in hardware.

In one embodiment, cipher 215 includes an output 245 connected to encryption component 246. The output 245 can transmit or otherwise provide ciphertext or plaintext to the message destination 220. In one embodiment, output 245 provides the ciphertext or plaintext to the message destination 220 as each block of ciphertext or plaintext is generated. Alternatively, output 245 may wait until an entire message (e.g., including multiple blocks) has been encrypted or decrypted before providing that message to message destination 220. Message destination 220 may be an application, user, file system, database, etc.

Figure 2B:
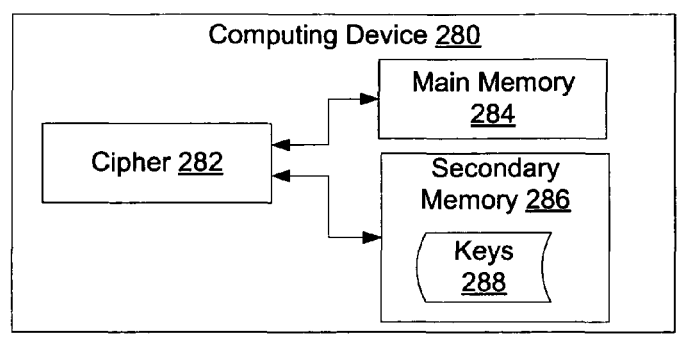
FIG. 2B illustrates an exemplary computing device, in accordance with one embodiment of the present invention.

FIG. 2B illustrates an exemplary computing device 280, in accordance with one embodiment of the present invention. The computing device 280 includes cipher 282 connected with a main memory 284 and a secondary memory 286. Cipher 282 may represent cipher 215 discussed above with reference to FIG. 2A. The main memory 284 may include volatile memory (e.g., read-only memory (ROM), flash memory, dynamic random access memory (DRAM) such as synchronous DRAM (SDRAM) or Rambus DRAM (RDRAM), etc.) or static memory (e.g., flash memory, static random access memory (SRAM), etc.). The secondary memory 286 may include one or more persistent data storage devices that may include, for example static memory, hard drives, optical drives, tape backup systems, etc. The secondary memory 286 may be local to the computing device 280 (as illustrated), or external to the computing device 280.

In one embodiment, keys 288 are stored in secondary memory 286. In another embodiment, keys 288 are stored in main memory 284. Keys 288 may be stored, for example, in a protected region of main memory 284 or secondary memory 286 (memory accessible only to certain processes). In yet another embodiment, keys 288 are stored externally to computing device 280. Such externally stored keys 288 may be stored, for example, in a USB dongle, firewire dongle, or other external storage device. In embodiments that implement external keys, encrypted regions of the main memory 284 and secondary memory 286 may not be decrypted unless the external storage device having keys 288 is connected with computing device 280.

Keys 288 can include multiple sub-keys that dictate variables to use when enciphering main memory 284 and secondary memory 286 using cipher 282. Each sub-key may encrypt a portion of main memory or secondary memory in a distinct computation round. Moreover, different keys may be used for encrypting different regions of main memory 284 and secondary memory 286. In one embodiment, keys 288 are encrypted such that a password must be given to enable access to them. Alternatively, the keys 288 may not be encrypted.

In one embodiment, cipher 282 is a hardware component of computing device 280. Alternatively, cipher 282 may include software that is part of an operating system, an application, or a combination thereof. Cipher 282 may also be a combination of software and hardware.

Cipher 282 can encipher data in the main memory 284 and the secondary memory 286 to secure such data. When enciphering data, new keys may be generated and stored, or existing keys may be provided. In one embodiment, the cipher 282 is configured to encrypt all of secondary memory 286 and main memory 284. In another embodiment, only some of the main memory 284 and/or secondary memory 286 are encrypted (e.g., using filesystem-level encryption). In both instances, encrypted data may not be read or used until cipher 282 deciphers the enciphered data using the same keys 288 used to encrypt the data.

Figures 3A, 3B:
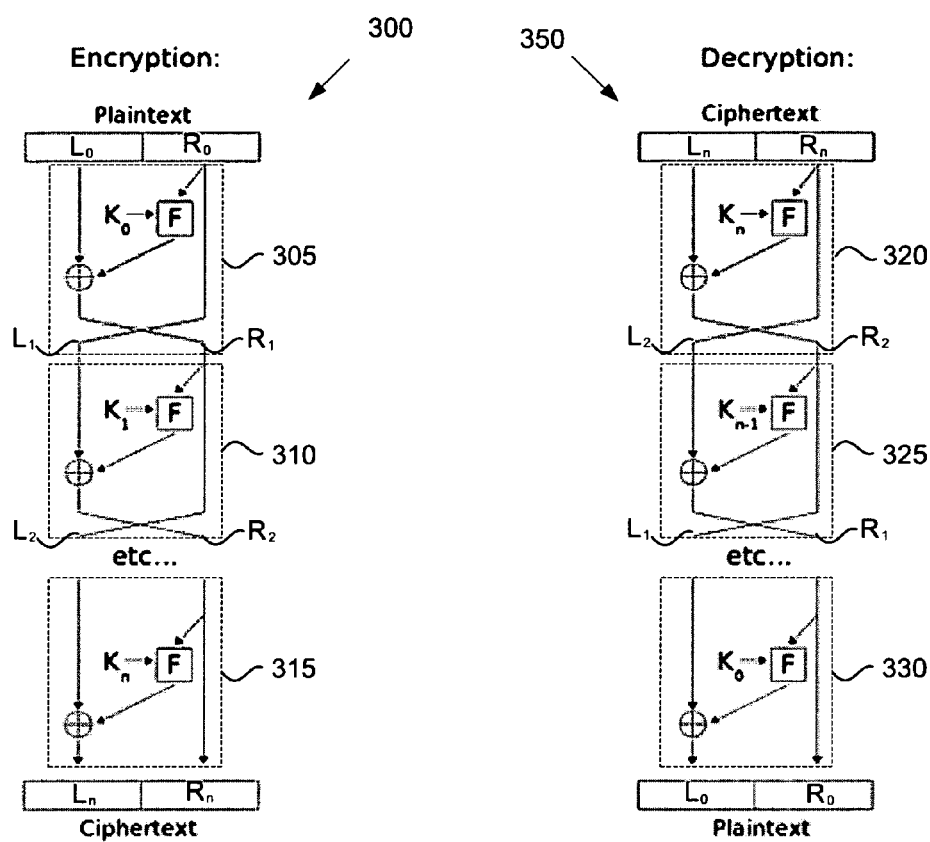
FIG. 3A illustrates a data flow corresponding to one embodiment of a data encryption process.
FIG. 3B illustrates a data flow corresponding to one embodiment of a data decryption process.

FIG. 3A illustrates a data flow 300 corresponding to one embodiment of a data encryption process. In one embodiment, plaintext data is processed by cipher 215 of FIG. 2A to generate ciphertext.

Referring to FIG. 3A, data in the form of plaintext is input into a block cipher. The block cipher can include up to n rounds of encryption, each of which may use a different sub-key. In the illustrated embodiment, the block cipher performs a first encryption round 305, a second encryption round 310, up to an nth encryption round 315 to generate ciphertext output.

In the first encryption round 305, the block cipher divides the plaintext into a left portion $L_0$ and a right portion $R_0$. The block cipher uses an encryption function F to encrypt plaintext based on a first key $K_0$. In one embodiment, function F performs a nonlinear substitution by multiplying the right portion $R_0$ of the plaintext by the first key $K_0$ over a finite field of even characteristic, modulo a fixed primitive polynomial. In an example, if the plaintext is 0110 0001 (the ASCII representation of the letter 'a' in binary), the first key $K_0$ is 1010, and the primitive polynomial is 10011, the output of the function F in the first round 305 would be:

$$0001 \otimes 1010 \bmod 10011 = 1010$$

In the exemplary data encryption process, the output of the function F in the first round 305 is then XORed with the left portion $L_0$ of the plaintext. Continuing the above example, this would result in:

$$1010 \oplus 0110 = 1100$$

A permutation operation is then performed on the output of the XOR operation and the right portion $R_0$ of the plaintext to result in an output block that has a left portion $L_1$ that is equal to $R_0$ and a right portion $R_1$ that is equal to the output of the XOR operation. Continuing the above example, the resulting values would be $L_1 = 0001$ and $R_1 = 1100$.

In the second encryption round 310, the block cipher uses the encryption function F to further encrypt $L_1$ and $R_1$ based on a second key $K_1$. In one embodiment, function F performs a nonlinear substitution by multiplying $R_1$ by the second key $K_1$ over the finite field of even characteristic, modulo the fixed primitive polynomial. Continuing the above example, since the primitive polynomial is 10011, if the second key $K_1$ is 1011, the output of the function F in the second round 310 would be:

$$1100 \otimes 1011 \bmod 10011 = 1101$$

In the exemplary data encryption process, the output of the function F in the second round 310 is then XORed with $L_1$. Continuing the above example, this would result in:

$$1101 \oplus 0001 = 1100$$

A permutation operation is then performed on the output of the XOR operation and the right portion $R_1$ of the plaintext to result in an output block that has a left portion $L_2$ that is equal to $R_1$ and a right portion $R_2$ that is equal to the output of the XOR operation. Continuing the above example, the resulting values would be $L_2 = 1100$ and $R_2 = 1100$.

This process may continue until the nth round of encryption 315 has been completed (using an nth sub-key $K_n$), to generate a final output of ciphertext having a left portion $L_n$ and a right portion $R_n$. Continuing the example described above, if the nth round or encryption 315 is a third round of encryption, and the nth sub-key $K_n$ is 1101, then the output of the function F in the nth round 315 would be:

$$1100 \otimes 1101 \bmod 10011 = 0011$$

The output of the function F in the nth round 315 is then XORed with $L_2$, resulting in:

$$0011 \oplus 1100 = 1111$$

A permutation operation can then be performed on the output of the XOR operation and the right portion $R_1$ of the plaintext to result in a final ciphertext having $L_n=1100$ and $R_n=1111$. Alternatively, the permutation operation may not be performed in the nth round, which would result in a final ciphertext of 1111 1100 ($L_n=1111$ and $R_n=1100$).

Each round of the illustrated data encryption process can be represented mathematically using the following algorithms:

$$L_{i+1} = R_i$$

$$R_{i+1} = L_i \oplus (R_i \otimes K_i \bmod Y)$$

where $K_i$ is the sub-key used for round i, and Y is the fixed primitive polynomial.

FIG. 3B illustrates a data flow 350 corresponding to one embodiment of a data decryption process. The data decryption process is an inverse of the data encryption process illustrated in FIG. 3A. In one embodiment, the data is processed by cipher 215 of FIG. 2A.

Referring to FIG. 3B, data in the form of ciphertext is input into a block cipher. The block cipher can include up to n rounds of decryption (matching a number of rounds of encryption used to generate the ciphertext), each of which may use a different sub-key. To properly decrypt the ciphertext, the sub-keys used in decryption should correspond to those sub-keys used for encryption. Such sub-keys can be applied in reverse order to an order in which they were used for encryption. In the illustrated embodiment, the block cipher performs a first decryption round 320, a second decryption round 325 through an nth decryption round 330. Each such decryption round in the illustrated embodiment includes using an encryption function F to decrypt ciphertext based on a sub-key (e.g., $K_n$, $K_{n-1}$, etc.). In one embodiment, function F performs a nonlinear substitution by multiplying the right portion $R_i$ of ciphertext by the key $K_i$ (where i is equal to the current round) over a finite field of even characteristic, modulo a fixed primitive polynomial. In one embodiment, the fixed primitive polynomial corresponds to a fixed primitive polynomial used to generate the ciphertext from plaintext. In the exemplary data decryption process, the output of the function F in the first round of decryption 320 is then XORed with the left portion $L_i$ of the ciphertext. A permutation operation is then performed on the output of the XOR operation and the right portion $R_i$ of the ciphertext to result in an output block that has a left portion $L_{i-1}$ that is equal to $R_i$ and a right portion $R_{i-1}$ that is equal to the output of the XOR operation. This process may continue until the nth round of decryption 330 has been completed (using a first sub-key $K_0$), to generate a final output of plaintext having a left portion $L_0$ and a right portion $R_0$.

Each round of the illustrated data decryption process can be represented mathematically using the following algorithms:

$$L_{i-1} = R_i$$

$$R_{i-1} = L_i \oplus (R_i \otimes K_i \bmod Y)$$

In an example, assume that the there are three rounds of decryption. Further assume for the example that the ciphertext is 1111 1100, the first key $K_0$ is 1010, the second key $K_{n-1}$ is 1011, the third key $K_n$ is 1101, and the primitive polynomial is 10011. After the first round of decryption 320, the output blocks are:

$$L_2 = R_3 = 1100$$

$$R_2 = L_3 \oplus (R_3 \otimes K_3 \bmod Y) = 1111 \oplus (1100 \otimes 1101 \bmod 10011) = 1100$$

After the second round of decryption 325, the output blocks are:

$$L_1 = R_2 = 1100$$

$$R_1 = L_2 \oplus (R_2 \otimes K_2 \bmod Y) = 1100 \oplus (1100 \otimes 1011 \bmod 10011) = 0001$$

After the third round of decryption 330, the output blocks are:

$$L_0 = R_1 = 0001$$

$$R_0 = L_1 \oplus (R_1 \otimes K_1 \bmod Y) = 1100 \oplus (0001 \otimes 1010 \bmod 10011) = 0110$$

A final permutation can then be performed to recreate the plaintext of 0110 0001. Alternatively, if no permutation was performed at the end of the nth round during encryption, then the original plaintext can be recreated without performing a final permutation. As illustrated in the above example, by using the same sub-keys for encryption and decryption, data can be enciphered for safe keeping, and deciphered for later use.

The exemplary encryption and decryption processes shown above in FIG. 3A and FIG. 3B, respectively, illustrate application of a nonlinear substitution (achieved by multiplying a portion of input data by sub-keys over a finite field of even characteristic, modulo a fixed primitive polynomial) to a simple Feistel Network, in accordance with one embodiment of the present invention. In other embodiments, such a nonlinear substitution may be used to replace the mixing functions and/or multiplication functions of, for example, IDEA or DES. Such replacement of the mixing functions and/or multiplication functions of existing block ciphers (e.g., DES, IDEA, etc.) by a nonlinear substitution that uses multiplication over a finite field of even characteristic, modulo a fixed primitive polynomial can improve the security of such block ciphers. For example, the integer multiplication, modulo 65537 that is used in the IDEA encryption algorithm may be replaced with multiplication over $GF(2^{16})$, modulo a primitive polynomial of the $16^{th}$ degree. Alternatively, multiplication over $GF(2^m)$, modulo a primitive polynomial of the $m^{th}$ degree, where m is an integer greater than 16, may also be used to replace the multiplication, modulo 65537 that is used in the IDEA encryption algorithm. Multiplication with such a field would increase the block size that the block cipher operates on. For example, using multiplication over $GF(2^{32})$ would require expanding the block size to 128 bits (from the 64 bits typically used in IDEA).

Figure 4:
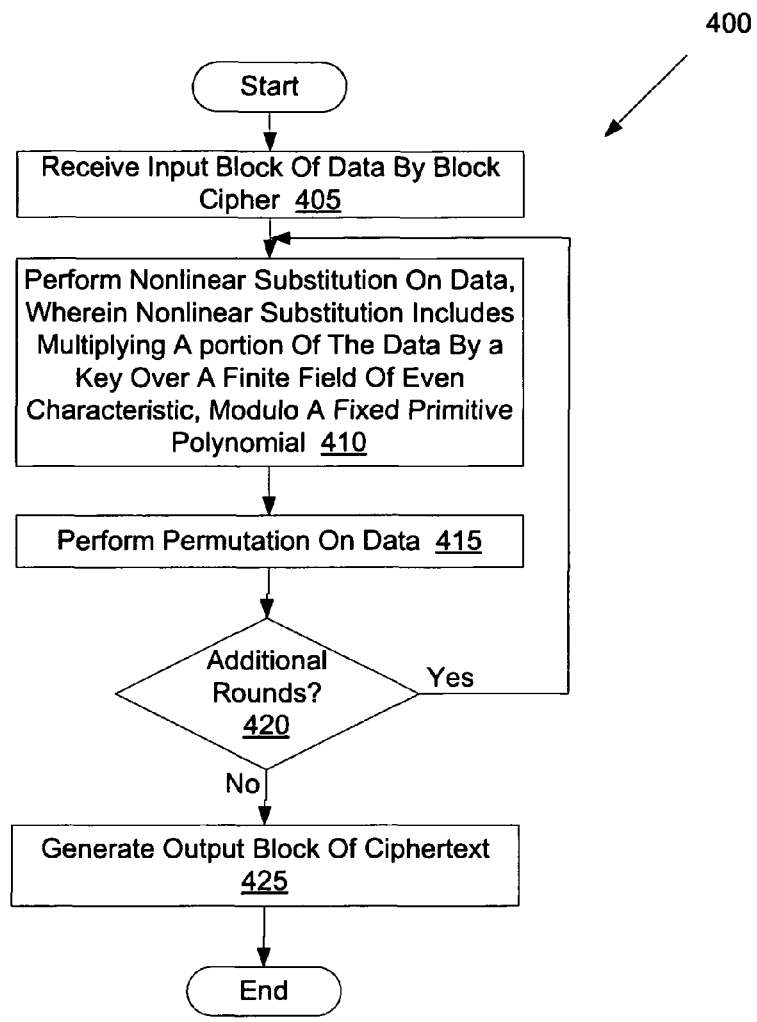
FIG. 4 illustrates a flow diagram of one embodiment for a method of encrypting data.

FIG. 4 illustrates a flow diagram of one embodiment for a method 400 of encrypting data. The method may be performed by processing logic that may comprise hardware (e.g., circuitry, dedicated logic, programmable logic, microcode, etc.), software (such as instructions run on a processing device), or a combination thereof. In one embodiment, method 400 is performed by cipher 215 of FIG. 2A.

Referring to FIG. 4, method 400 includes receiving an input block of data by a block cipher (block 405). The input block of data may be provided by a message source, such as an application, a user, a file system, a database, etc. In one embodiment, the input block of data may include more bits than can be operated on by the block cipher. In such an occurrence, the block cipher may divide the input block of data into multiple data blocks, each of which is sized such that the block cipher can operate on it.

At block 410, the block cipher performs a nonlinear substitution on the data. The nonlinear substitution includes multiplying a portion of the data or all of the data by a key over a finite field of even characteristic, modulo a fixed primitive polynomial. In one embodiment, the finite field is $GF(2^m)$, where m is an integer greater than or equal to 1. Such a finite field would have an order of $2^m$ (include $2^m$ elements), have a degree of m, and have a characteristic of 2. In one embodiment, the primitive polynomial is a distinguished polynomial that has a degree of m.

At block 415, a permutation is performed on the block of data. The permutation may include, for example, a function for rearranging the bits of the data. Though the permutation is illustrated to be performed after the nonlinear substitution, in certain embodiments the permutation is performed prior to the nonlinear substitution. Alternatively, the permutation may not be performed.

At block 420, processing logic determines whether additional rounds of encryption should be performed. In one embodiment, the number of rounds of encryption is fixed for the block cipher. The number of rounds may be fixed at, for example, 5 rounds, 8 rounds, 20 rounds, etc. A greater number of rounds can increase the security of encryption, but can also increase the encryption and decryption time. In another embodiment, the number of rounds can be user specified. For example, the user may be given the option to select the level of security he or she desires. A selection of a high degree of security may cause many rounds of encryption to be performed, while a selection of a low degree of security may cause only a few rounds of encryption to be performed. In one embodiment, a different sub-key is used with each round of encryption. If additional rounds of encryption should be performed, the method returns to block 410. If no additional rounds of encryption should be performed, the method proceeds to block 425 and an output block of ciphertext is generated. The method then ends.

In an alternative embodiment, method 400 may not include block 415, and no permutation may be performed on the data. In another embodiment, a permutation may be performed for some encryption rounds, but not for other encryption rounds. For example, the permutation may be performed for all but the last encryption round.

In addition to encrypting an input block of plaintext, method 400 may also be used to decrypt an input block of ciphertext. In one embodiment, the process of decryption is the same as the process of encryption, except that the sub-keys that were used for encryption are applied in reverse order. For example, the last sub-key used to encrypt the data would be the first sub-key used to decrypt that same data. For decryption, an initial permutation may or may not be performed before the first nonlinear substitution is performed.

Figure 5:
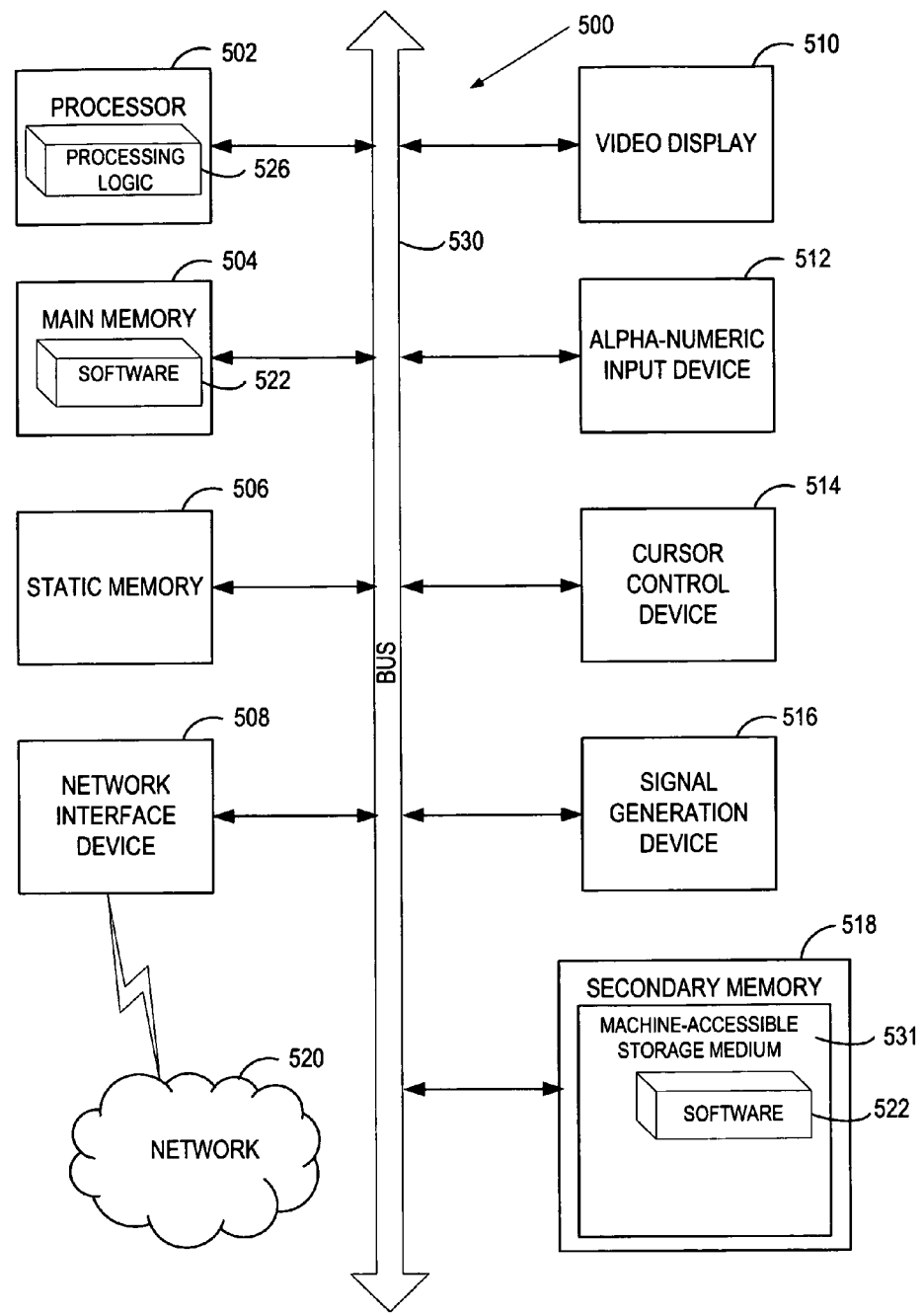
FIG. 5 illustrates a block diagram of an exemplary computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the encryption component 246 of FIG. 2A, and/or a software library containing methods that call the encryption component 246. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
receiving an input block;
receiving a plurality of sub-keys;
receiving a user specification of a level of security;
determining a number of rounds of computation to perform based on the user specification;
performing, by a processing device, the determined number of rounds of computation on the input block, wherein a different sub-key is used for each round of computation, at least some rounds of computation comprising:
performing a nonlinear substitution on a portion of the input block, wherein performing the nonlinear substitution comprises computing a product of the portion of the input block and one of the plurality of sub-keys over a finite field of even characteristic, modulo a fixed primitive polynomial to obtain a substituted portion, wherein the substituted portion is equal in size to the portion of the input block;
performing an exclusive-or (XOR) operation using the substituted portion and a second portion of the input block;
performing a permutation on the input block; and
generating an output block based on the input block when the determined number of rounds of computation on the input block are complete.

2. The method of claim 1, further comprising:
for each round of computation, determining whether to perform the permutation on the input block by an encryption logic.

3. The method of claim 1, wherein the finite field includes $2^m$ elements, where 2 is the characteristic of the finite field and m is an integer greater than or equal to 1.

4. The method of claim 1, wherein the primitive polynomial has a degree that is equal to m.

5. The method of claim 1, wherein the block cipher encrypts data according to international data encryption algorithm (IDEA), the method further comprising:
utilizing the nonlinear substitution to replace an integer multiplication operation of the international data encryption algorithm (IDEA).

6. The method of claim 1, wherein the block cipher encrypts data according to data encryption standard (DES), the method further comprising:
utilizing the nonlinear substitution to replace a mixing function of the data encryption standard (DES).

7. A system comprising:
a memory to store instructions for a block cipher encryption system; and
a processing device to execute the instructions, wherein the instructions cause the processing device to:
receive an input block;
receive a plurality of sub-keys via a second input;
receive a user specification of a level of security;
determine a number of rounds of computation to perform based on the user specification;
perform the determined number of rounds of computation on the input block, wherein a different sub-key is used for each round of computation, at least some rounds of computation comprising:
performing a nonlinear substitution on a portion of the input block by computing a product of the portion of the input block and one of the plurality of sub-keys over a finite field of even characteristic, modulo a fixed primitive polynomial to obtain a substituted portion, wherein the substituted portion is equal in size to the portion of the input block;
performing an exclusive-or (XOR) operation using the substituted portion and a second portion of the input block;
performing a permutation on the input block; and
generate an output block based on the input block when the determined number of rounds of computation on the input block are complete.

8. The system of claim 7, further comprising the instructions to cause the processing device to:
determine whether to perform the permutation on the input block by an encryption logic for each round of computation.

9. The system of claim 7, wherein the finite field includes $2^m$ elements, where 2 is the characteristic of the finite field and m is an integer greater than or equal to 1.

10. The system of claim 7, wherein the primitive polynomial has a degree that is equal to m.

11. The system of claim 7, wherein the instructions cause the processing device to encrypt data according to international data encryption algorithm (IDEA), wherein the nonlinear substitution is used to replace an integer multiplication operator of the international data encryption algorithm (IDEA).

12. The system of claim 7, wherein the instructions cause the processing device to encrypt data according to data encryption standard (DES), wherein the nonlinear substitution is used to replace a mixing function of the data encryption standard (DES).

13. A non-transitory computer readable storage medium including instructions that, when executed by a processing device, cause the processing device to perform a method comprising:
receiving an input block;
receiving a plurality of sub-keys;
receiving a user specification of a level of security;
determining a number of rounds of computation to perform based on the user specification;
performing, by the processing device, the determined number of rounds of computations on the input block, wherein a different sub-key is used for each round of computation, at least some rounds of computation comprising:
performing a nonlinear substitution on a portion of the input block, wherein performing the nonlinear substitution comprises computing a product of the portion of the input block and one of the plurality of sub-keys over a finite field of even characteristic, modulo a fixed primitive polynomial to obtain a substituted portion, wherein the substituted portion is equal in size to the portion of the input block;
performing an exclusive-or (XOR) operation using the substituted portion and a second portion of the input block;
performing a permutation on the input block; and generating an output block based on the input block when the determined number of rounds of computation on the input block are complete.

14. The non-transitory computer readable storage medium of claim 13, the method further comprising:
for each round of computation, determining whether to perform the permutation on the input block by an encryption logic.

15. The non-transitory computer readable storage medium of claim 13, wherein the finite field includes $2^m$ elements, where 2 is the characteristic of the finite field and m is an integer greater than or equal to 1.

16. The non-transitory computer readable storage medium of claim 13, wherein the primitive polynomial has a degree that is equal to m.

17. The non-transitory computer readable storage medium of claim 13, wherein the block cipher encrypts data according to international data encryption algorithm (IDEA), the method further comprising:
utilizing the nonlinear substitution to replace an integer multiplication operation of the international data encryption algorithm (IDEA).

18. The non-transitory computer readable storage medium of claim 13, wherein the block cipher encrypts data according to data encryption standard (DES), the method further comprising:
utilizing the nonlinear substitution to replace a mixing function of the data encryption standard (DES).

* * * * *